(12) United States Patent
Odate et al.

(10) Patent No.: US 11,489,974 B2
(45) Date of Patent: Nov. 1, 2022

(54) IMAGE FORMING APPARATUS

(71) Applicant: CANON KABUSHIKI KAISHA, Tokyo (JP)

(72) Inventors: Takashi Odate, Shizuoka (JP); Keizo Kojima, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/329,874

(22) Filed: May 25, 2021

(65) Prior Publication Data
US 2021/0377397 A1 Dec. 2, 2021

(30) Foreign Application Priority Data
May 29, 2020 (JP) .............................. JP2020-094059

(51) Int. Cl.
*G06F 3/12* (2006.01)
*H04N 1/00* (2006.01)

(52) U.S. Cl.
CPC ..... *H04N 1/00087* (2013.01); *H04N 1/00015* (2013.01); *H04N 1/00037* (2013.01); *H04N 1/00042* (2013.01); *H04N 1/00649* (2013.01)

(58) Field of Classification Search
CPC ........... H04N 1/00087; H04N 1/00015; H04N 1/00037; H04N 1/00042; H04N 1/00649
See application file for complete search history.

(56) References Cited

U.S. PATENT DOCUMENTS

| 8,891,997 | B2 | 11/2014 | Samejima |
|---|---|---|---|
| 9,274,490 | B2 | 3/2016 | Kojima |
| 9,665,060 | B2 | 5/2017 | Odate |
| 10,547,244 | B2 | 1/2020 | Odate |
| 2013/0064566 | A1 | 3/2013 | Kojima |
| 2015/0227328 | A1* | 8/2015 | Yokoyama ......... H04N 1/00891 358/1.14 |
| 2016/0036335 | A1 | 2/2016 | Kojima |
| 2018/0101117 | A1* | 4/2018 | Yoshida ............. G03G 15/2032 |
| 2020/0228008 | A1 | 7/2020 | Kojima |

FOREIGN PATENT DOCUMENTS

| JP | 8-204890 A | 8/1996 | |
|---|---|---|---|
| JP | 2015-77714 A | 4/2015 | |
| JP | 2015077714 A | * 4/2015 | ......... H04N 1/00087 |

* cited by examiner

*Primary Examiner* — Moustapha Diaby
(74) *Attorney, Agent, or Firm* — Venable LLP

(57) ABSTRACT

An image forming apparatus includes a sheet feeding portion, a detecting portion, and a controller. The controller sets a state of the detecting portion at a first monitoring state in which a detection result of the detecting portion is acquired to detect presence or absence of the recording material by supplying the electric power to the detecting portion in a first cyclic period. In case that the detection result of the detecting portion changes in the first monitoring state, the controller switches the state of the detecting portion to a second monitoring state in which a detection result of the detecting portion is acquired by supplying the electric power to the detecting portion in a second cyclic period shorter than the first cyclic period.

13 Claims, 7 Drawing Sheets

IMAGE FORMING APPARATUS

FIELD OF THE INVENTION AND RELATED ART

The present invention relates to an image forming apparatus.

In recent years, in an image forming apparatus such as a printer, a copying machine or a facsimile machine, electric power saving has been strongly required. Particularly, in the image forming apparatus, the electric power saving such that electric power consumption in a stand-by state in which an image forming operation is not performed is reduced has been required. In order to meet such electric power saving, an image forming apparatus including (electric) power saving mode in which the electric power consumption is reduced by enabling only a minimum necessary function in the stand-by state increases. In order to change an operation mode of the image forming apparatus from a power saving mode to a normal mode in which an image forming operation is performed, for example, there is a need that a user performs an operation for switching the operation mode to the normal mode through an operating portion or the like of the image forming apparatus. As another operation for switching the operation mode to the normal mode, for example, it is possible to cite mounting and dismounting of a sheet feeding cassette of the image forming apparatus, opening and closing of a maintenance door when a cartridge is exchanged, supply of a sheet to a manual feeding tray or removal of the sheet from the manual feeding tray, reception of a print switch from an external computer, and the like.

In an operation in the power saving mode, in order to reduce the electric power consumption, the electric power consumption of a CPU is reduced by causing the CPU to perform an intermittent operation, for example. Further, the electric power consumption of the image forming apparatus is reduced by, for example, suppling electric power only to a detecting portion for detecting a change in state of a unit operated by the user for changing the operation mode of the image forming apparatus from the power saving mode to the normal mode. A signal outputted from the detecting portion which detected to the state change of the unit is inputted as an interrupt signal to the CPU. By the input of the interrupt signal during the operation in the power saving mode, the CPU notified of the state change of the unit changes the operation mode from the power saving mode to the normal mode.

In Japanese Laid-Open Patent Application (JP-A) 2015-77714, a constitution in which the operation mode is changed from the power saving mode to the normal mode when during an operation in the power saving mode of the image forming apparatus, detection that a state of a manual feeding tray is changed from a state in which a sheet is not placed on the manual feeding tray to a state in which the recording material is placed on the manual feeding tray is made has been disclosed. Also, during the operation in the power saving mode, by supplying the electric power to a detecting portion for detecting presence or absence of the sheet on the manual feeding tray, it is possible to detect an operation performed by a user for carrying out image formation, so that the change in operation made from the power saving mode to the normal mode can be made in a short time. By this, usability can be improved. However, the electric power has to be supplied to the detecting portion also during the operation in the power saving mode, and therefore, for example, in the case where an optical sensor such as a photo-interruptor is used in the detecting portion, a light beam is always emitted from a light emitting portion, and therefore, a problem such that the electric power consumption becomes large arises. Therefore, in JP-A Hei 8-204890, a constitution in which electric power supply to the photo-interruptor and cutting-off of the electric power supply are periodically switcheable is employed, and a constitution in which the electric power consumption of the photo-interruptor is suppressed by changing a time, in which the electric power is supplied, depending on a state of the image forming apparatus or a state of the sensor is disclosed.

In the case where the state of the sensor such as the above-described photo-interruptor is acquired, in order to prevent erroneous detection due to noise or the like, there is a need to discriminate a state by acquiring the sensor state a plurality of times. A method in which the sensor state is acquired the plurality of times, and in the case where the same state occurs a predetermined number of times or in the case where the same state is continuously detected a certain number of times or more, the acquired state is determined as an effective state is used in general. For that reason, in order to determine the sensor state, it takes a time of several tens of msec (milliseconds) to several hundreds of msec. For example, as disclosed in the above-described JP-A Hei 8-204890, in the case where the electric power supply to the photo-interruptor and the cutting-off of the electric power supply are periodically repeated, an electric power supply time (period) is required to be several tens of msec to several hundreds of msec. For that reason, in order to sufficiently achieve an effect of suppressing electric power consumption by cutting off the electric power supply, there is a need to provide an electric power cutting-off time which is several times (several hundreds of msec to several sec) the electric power supply time. When the electric power supply cutting-off time becomes long, even when the user performs an operation for switching the operation mode to the normal mode through an operating portion or the like of the image forming apparatus in that time (period), in a period in which the electric power supply is cut off, a controller of the image forming apparatus cannot detect the operation of the operating portion or the like by the user. As a result, in a period in which the electric power is supplied, the controller detects the operation of the operating portion or the like by the user, so that a time lag occur until the controller detects the operation by the user. Thereafter, the controller performs control in which the operation mode of the image forming apparatus is switched to the normal mode, and therefore, usability lowers due to a time lag from operation timing of the user until the operation mode of the image forming apparatus is actually changed to the normal mode. On the other hand, when the period in which the electric power is supplied is made short, although the usability is improved, reduction of the electric power consumption by the sensor such as the photo-interruptor cannot be sufficiently realized.

SUMMARY OF THE INVENTION

According to an aspect of the present invention, there is provided an image forming apparatus comprising: a sheet feeding portion where a recording material is placed; a detecting portion configured to detect presence or absence of the recording material placed on the sheet feeding portion by being supplied with electric power; and a controller configured to control an image forming operation, wherein the controller sets a state of the detecting portion at a first monitoring state in which a detection result of the detecting portion is acquired to detect the presence or absence of the recording material by supplying the electric power to the detecting portion in a first cyclic period, and in case that the detection result of the detecting portion changes in the first monitoring state, the controller switches the state of the detecting portion to a second monitoring state in which a detection result of the detecting portion is acquired by supplying the electric power to the detecting portion in a second cyclic period shorter than the first cyclic period.

Further features of the present invention will become apparent from the following description of exemplary embodiments with reference to the attached drawings.

Figure 2:
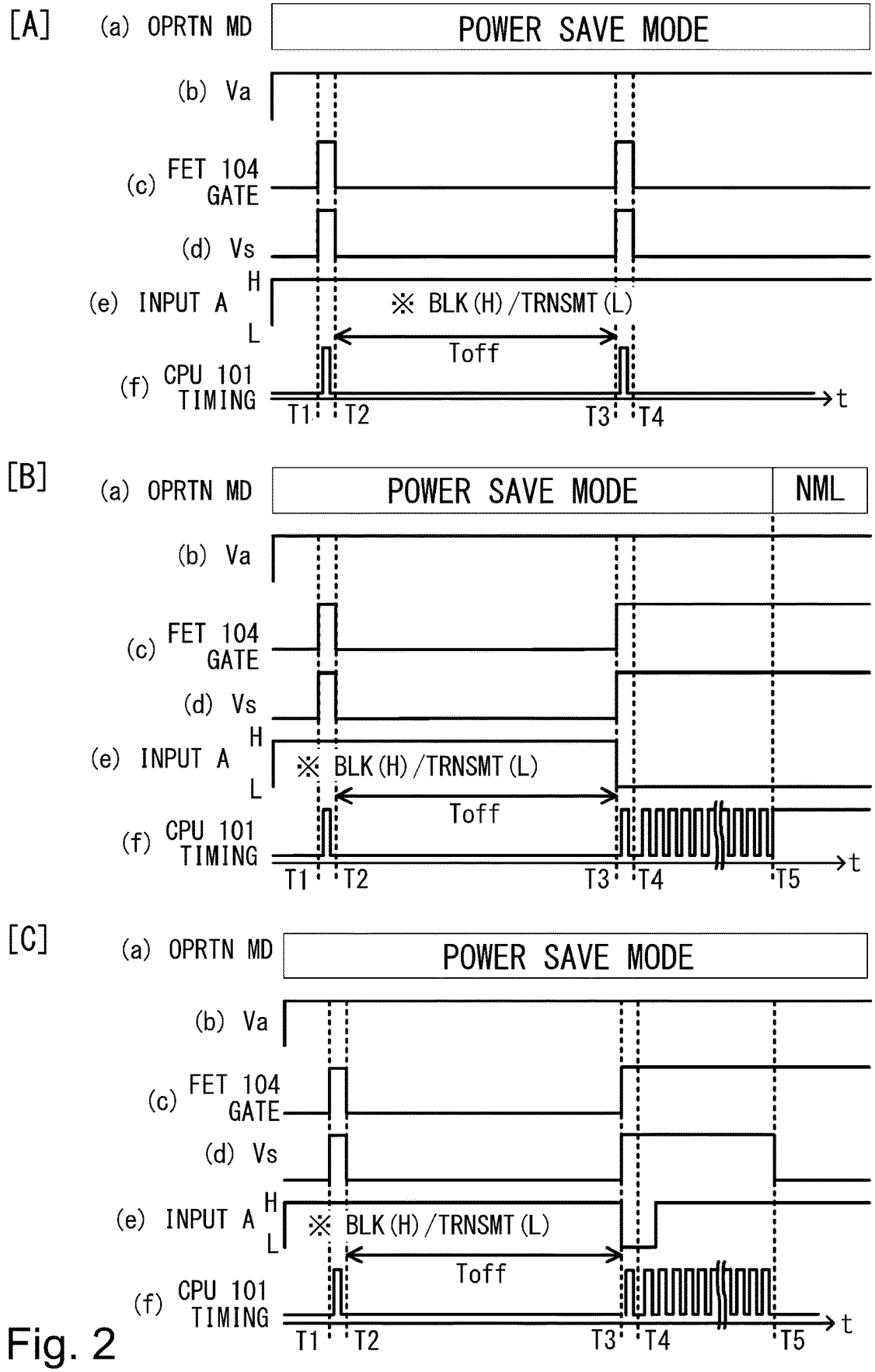

Parts [A], [B] and [C] of FIG. 2 are timing charts for illustrating monitoring modes in the embodiment 1.

Figure 3:
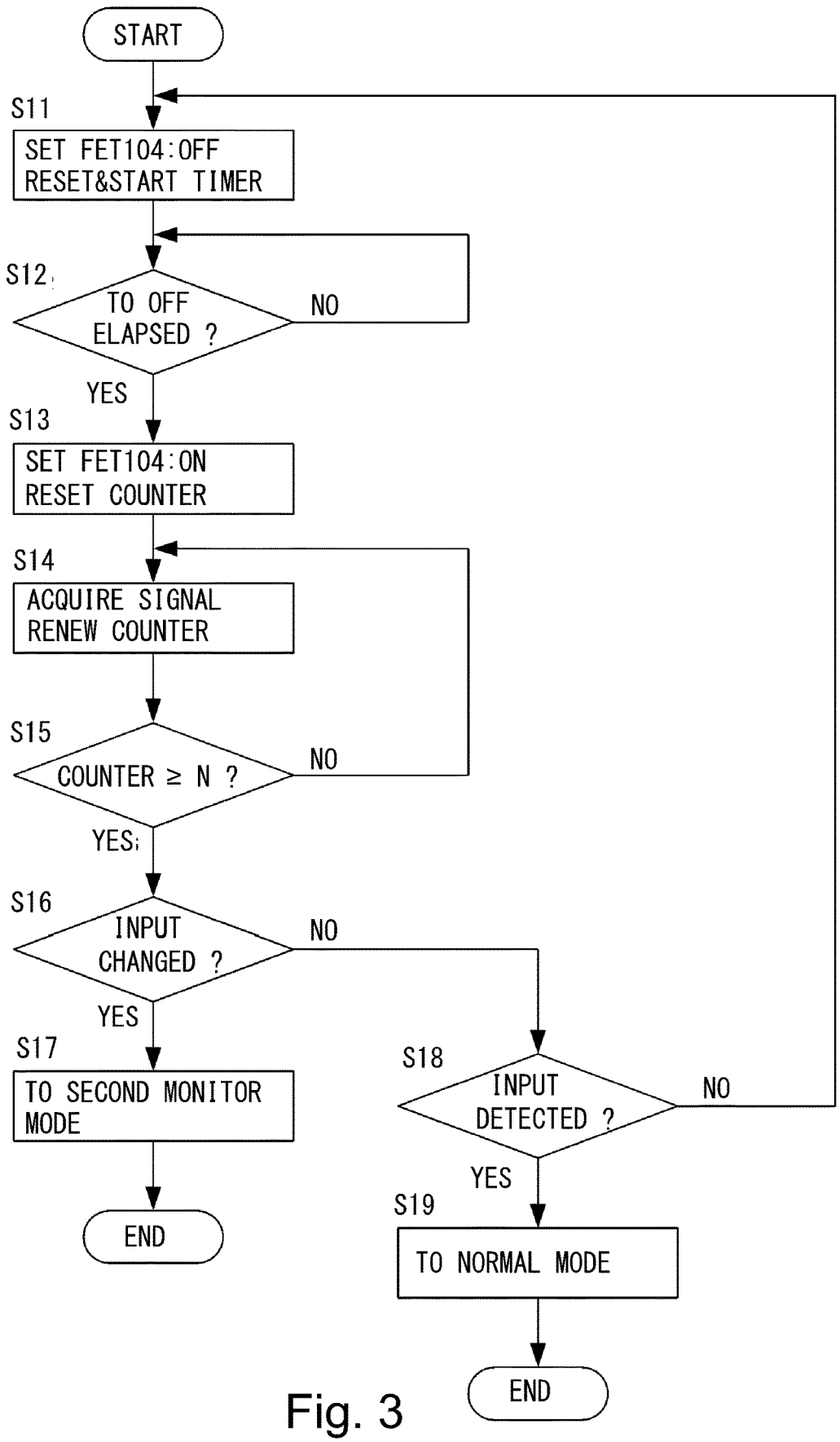

FIG. 3 is a flow chart showing a control sequence of an operation in a first monitoring mode in the embodiment 1.

Figure 4:
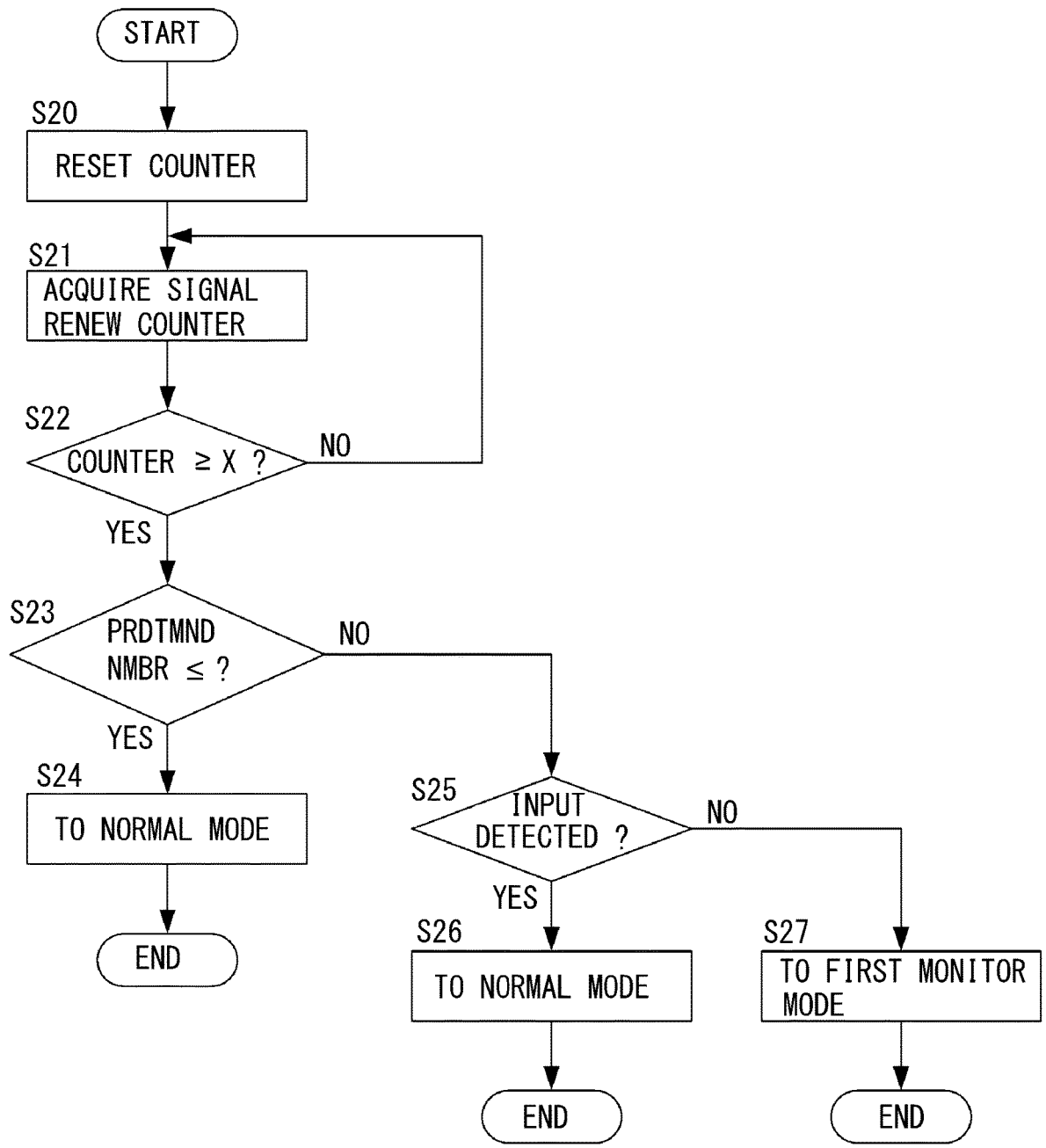

FIG. 4 is a flow chart showing a control sequence of an operation in a second monitoring mode in the embodiment 1.

Figure 5:
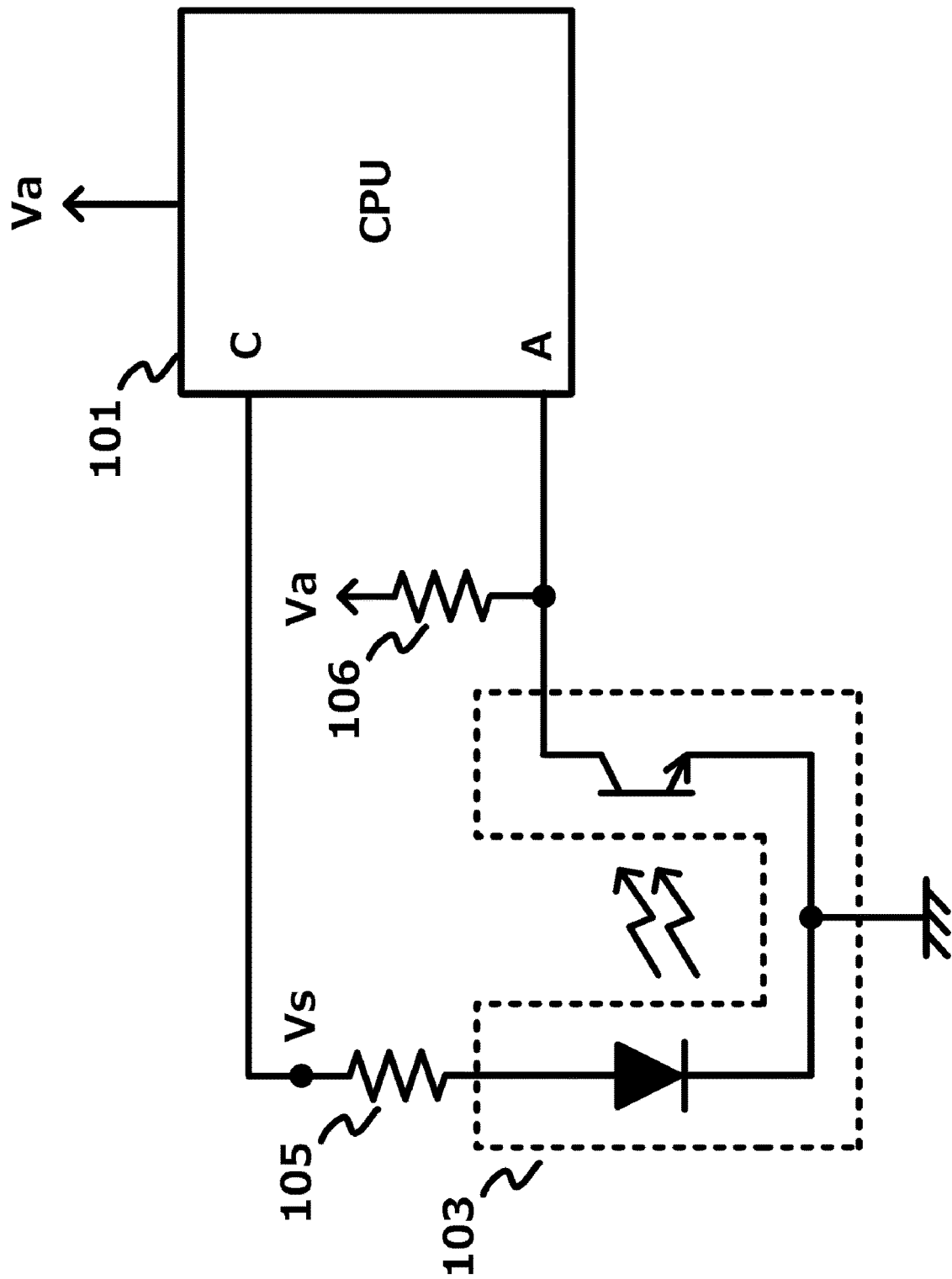

FIG. 5 is a circuit diagram showing another constitution of the controller and the peripheral circuit thereof in the embodiment 1.

Figure 6:
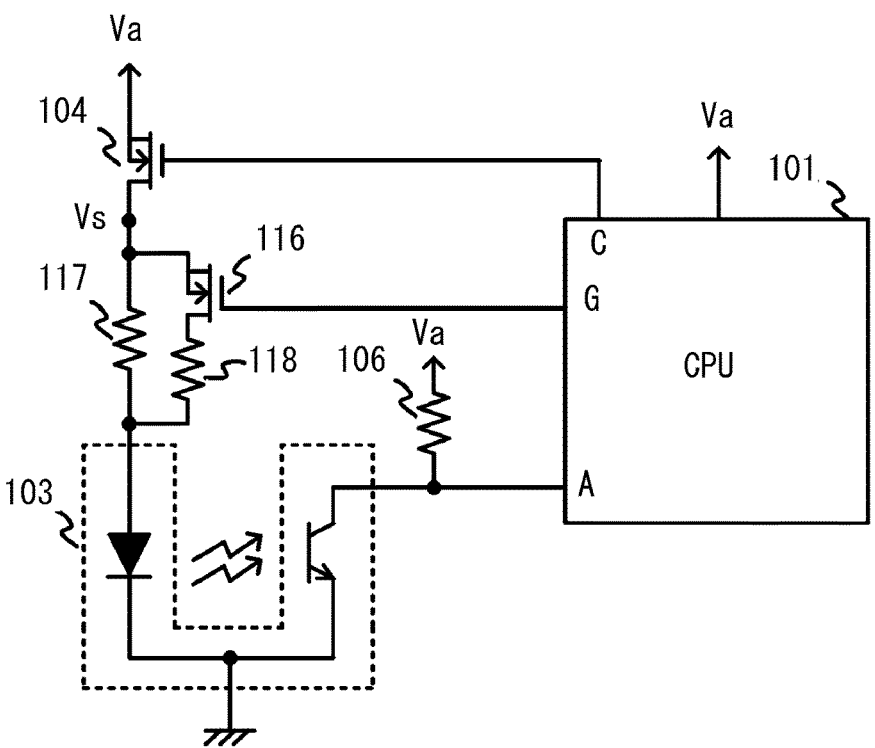
Figure 6:
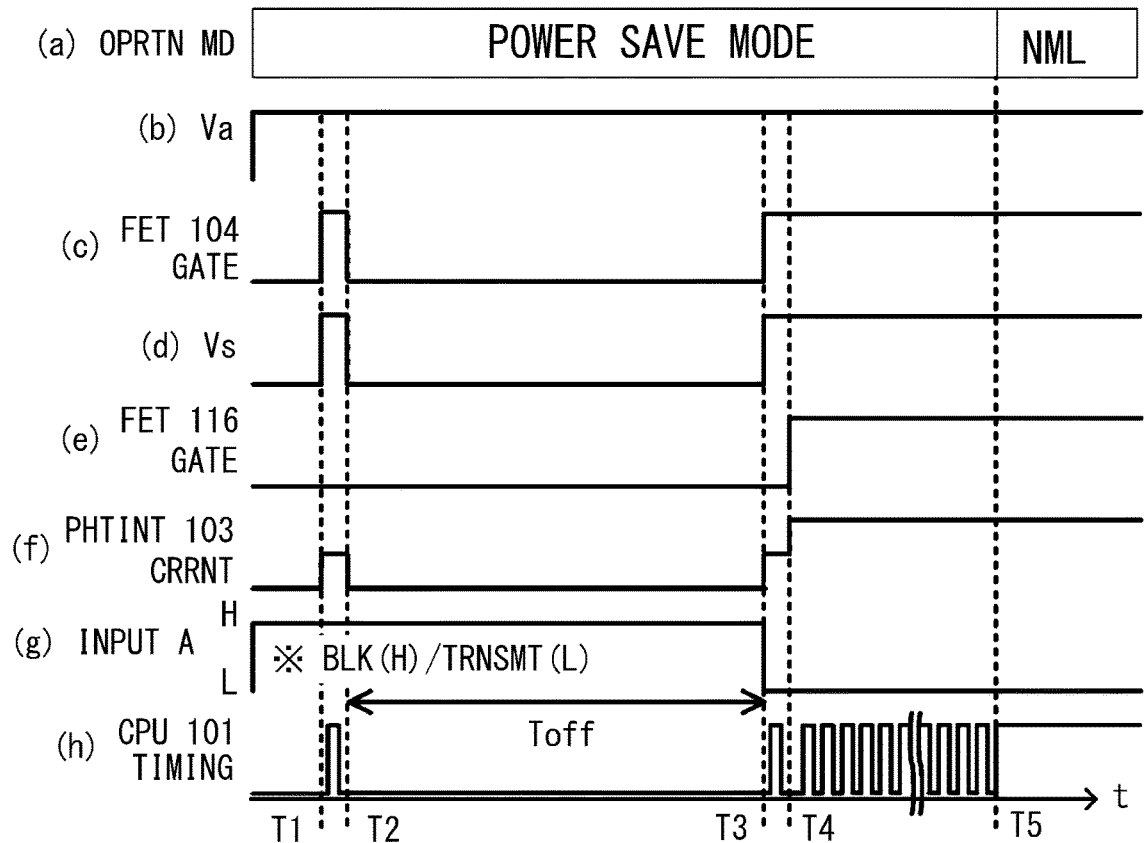

Part [A] of FIG. 6 is a circuit diagram showing a constitution of a controller and a peripheral circuit thereof in an embodiment 1, and part [B] of FIG. 6 is a timing chart for illustrating a monitoring mode in the embodiment 2.

Figure 7:
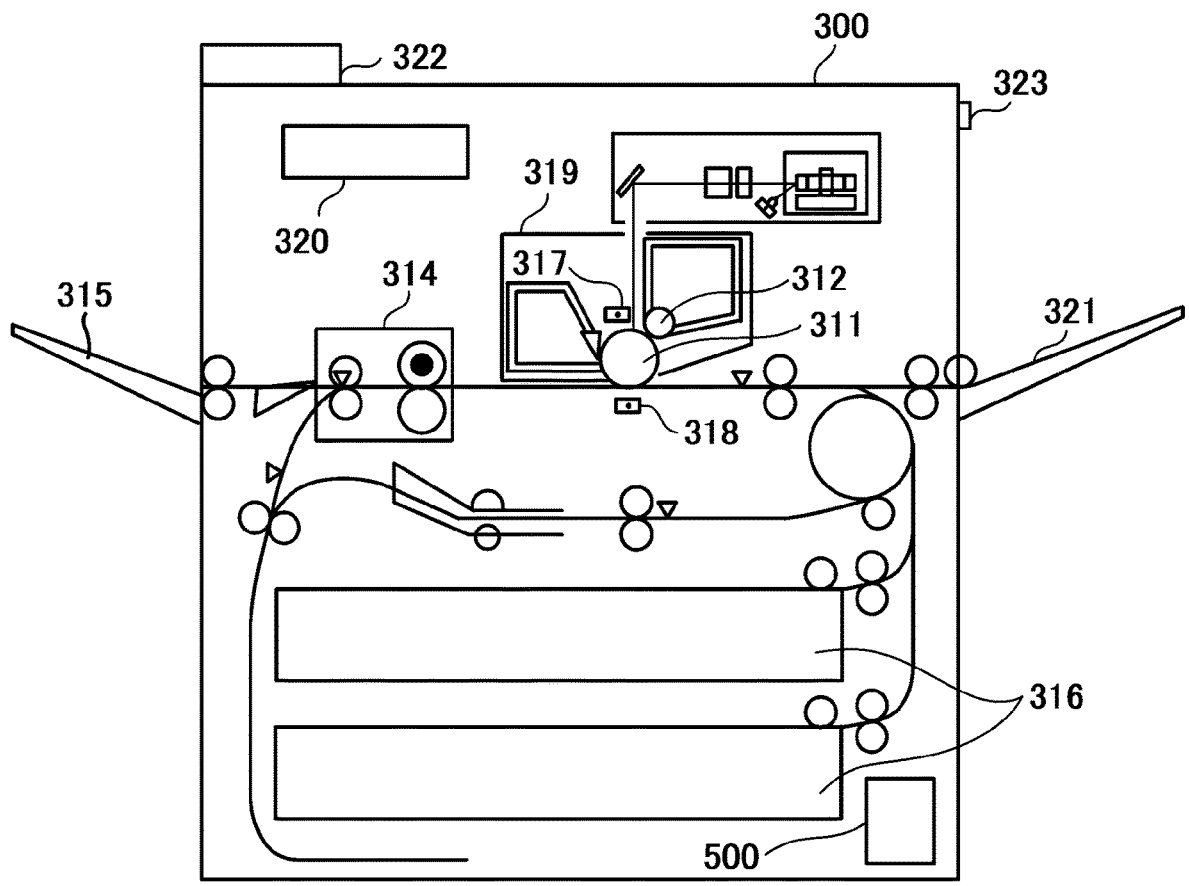

FIG. 7 is a schematic sectional view showing a structure of an image forming apparatus according to an embodiment 3.

DESCRIPTION OF THE EMBODIMENTS

In the following, embodiments for carrying out the present invention will be specifically described with reference to the drawings.

Embodiment 1

Constitution of Controller and Peripheral Circuit

Figure 1:
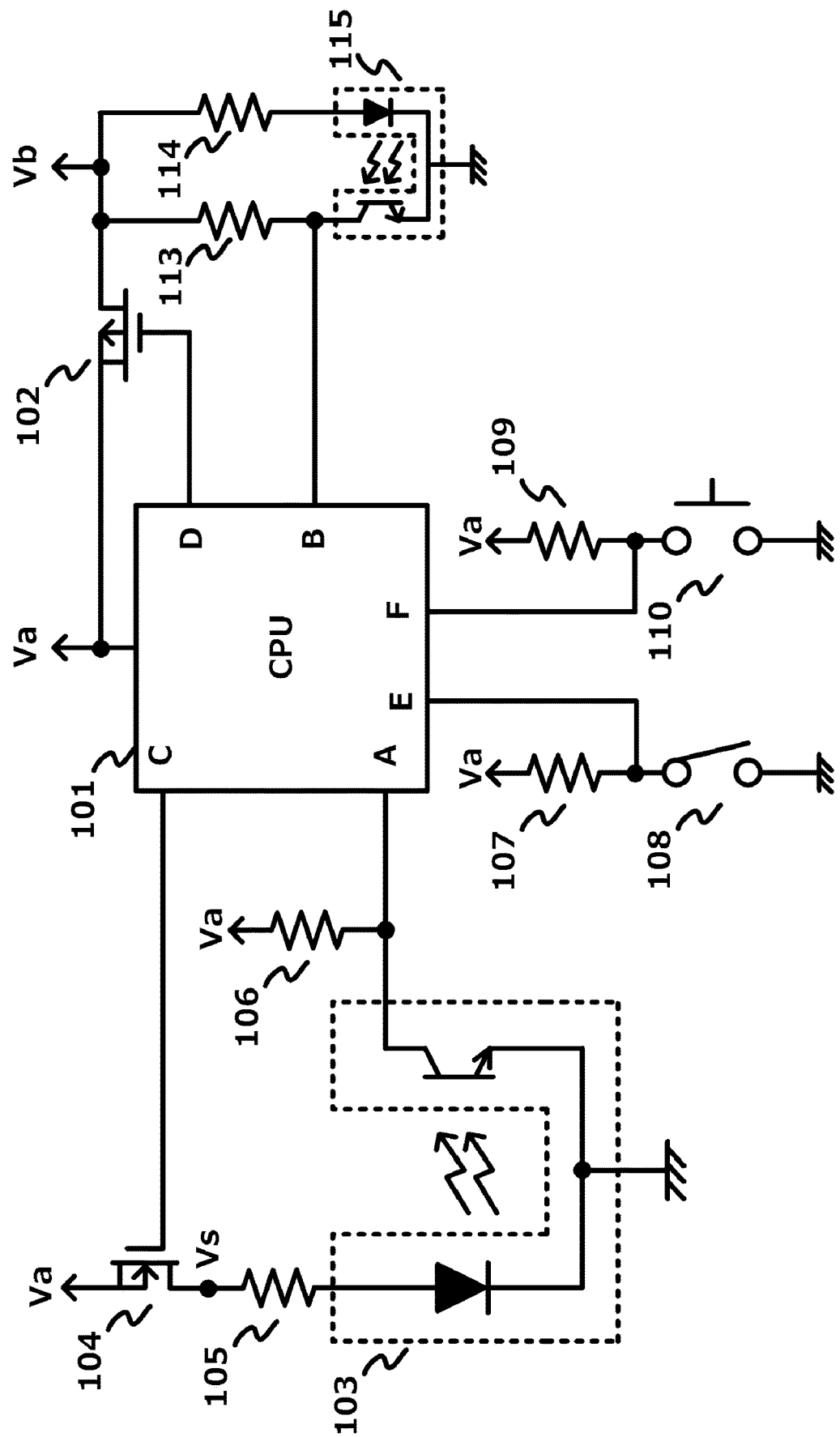
FIG. 1 is a circuit diagram showing a constitution of a controller and a peripheral circuit thereof in an embodiment 1.

FIG. 1 is a circuit diagram showing a circuit constitution of a controller for controlling image forming apparatus according to an embodiment 1 and a peripheral circuit thereof. A CPU 101 which is the controller (control means) is supplied with a power source voltage Va and carries out an image forming operation of the image forming apparatus and various pieces of control depending on input or the like through an operating portion by a user. Further, the CPU 101 is provided with terminals for detecting states of various switches (for example, a door switch, a power source (voltage source) switch and the like), terminals for acquiring information from respective state detecting portions, and terminals for outputting control signals for suppling the power source voltages Va to the respective state detecting portions and for stopping the supply of the voltages.

In FIG. 1, a door switch 108, for example, a switch for detecting an open/close state of a maintenance door subjected to an opening/closing operation when a cartridge used as an image forming portion of the image forming apparatus is exchanged. The door switch 108 is connected at one end thereof to the ground (GND), and is connected at the other end thereof not only to the power source voltage Va through a resistor 107 but also to a terminal E of the CPU 101. In a state in which the maintenance door is open, the door switch 108 is in an open state, so that a high level signal is inputted to the terminal E of the CPU 101. On the other hand, in a state in which the maintenance door is closed, the door switch 108 is in a connected state, so that a low level signal is inputted to the terminal E of the CPU 101.

Further, a power source switch 110 is a switch for turning on and off a power source (voltage source) of the image forming apparatus. The power source switch 110 is connected at one end thereof to the ground (GND), and is connected at the other end thereof not only to the power source voltage Va through a resistor 109 but also to a terminal F of the CPU 101. The power source switch 110 is put in a connected state when is turned on, so that a low level signal is inputted to the terminal F of the CPU 101. On the other hand, the power source switch 110 is put in an open state when is turned off, so that a high level signal is inputted to the terminal F of the CPU 101.

A photo-interruptor 103 which is a detecting means is a detecting portion for detecting whether or not a sheet is placed on a manual feeding tray which is a sheet (paper) feeding means. The photo-interruptor 103 is constituted by a light emitting diode (LED) which a light emitting portion for emitting a light beam and a photo-transistor which is a light receiving portion which is turned on or off depending on the light beam emitted from the LED. An anode terminal of the LED of the photo-interruptor 103 is connected to the power source voltage Va through a resistor 105. On the other hand, the photo-transistor is connected at an emitter terminal thereof to the ground (GND) and is connected at a collector terminal thereof not only to the power source voltage Va through a resistor 106 but also to a terminal A of the CPU 101. Further, between the LED and the photo-transistor, a flag which changes in position thereof depending on presence or absence the sheet of the manual feeding tray. In the case the sheet is not placed on the manual feeding tray, the flag is positioned between the LED and the photo-transistor. For that reason, the light beam emitted from the LED is in a blocked state in which the light beam is blocked by the flag, and therefore, the photo-transistor is put in an OFF state. As a result, to the terminal A of the CPU 101, the power source voltage Va is inputted through the resistor 106, and therefore, a level of the terminal A becomes a high level. On the other hand, in the case where the sheet is placed on the manual feeding tray, the flag is moved to a position deviated from between the LED and the photo-transistor. For that reason, the light beam emitted from the LED is not blocked by the flag and thus passes through the photo-interruptor 103, and therefore, the photo-transistor is put in an ON state, so that a current flows from the power source voltage Va through the resistor 106. As a result, a potential of the collector terminal of the photo-transistor is the same potential as a ground potential, and therefore, a level of the terminal A of the CPU 101 becomes a low level.

A photo-interruptor 115 is a detecting portion having a constitution similar to the constitution of the photo-interruptor 103. In this embodiment, for example, various detecting portions for detecting states of the apparatus, such as a sensor for detecting presence or absence of sheets accommodated in a sheet feeding cassette of the image forming apparatus and a sensor for detecting presence or absence of a cartridge or the like which is detachably mountable in the image forming apparatus and which forms the image are included. An anode terminal of an LED of the photo-interruptor 115 is connected to a power source voltage Vb through a resistor 114. On the other hand, an emitter terminal of a photo-transistor is connected to the ground (GND), and a collector terminal is connected not only to the power source voltage Vb through a resistor 113 but also to a terminal B of the CPU 101.

The resistors 105, 107, 109 and 114 are limiting resistors of currents flowing through the LED of the photo-interruptor 103, the door switch 108, the power source switch 110, and the LED of the photo-interruptor 115, respectively. Further, the resistors 106 and 113 are pull-up resistors for determining states of the terminals A and B, respectively, when the light beams from the LEDs are blocked by the flags in the photo-interruptors 103 and 115.

A field-effect transistor (hereinafter, referred to as FET) 104 is an FET of N-channel type. The FET 104 is a switch (first switch means) for suppling, as a power source voltage Vs for the photo-interruptor 103, the power source voltage Va always supplied from an electric power unit (not shown) of the image forming apparatus. In the case where output from a terminal C of the CPU 101 to a gate terminal of the FET 104 is at a high level, the FET 104 is put in an ON state, so that the power source voltage Va is supplied to the photo-interruptor 103. On the other hand, in the case where the output from the terminal C of the CPU 101, to the gate terminal of the FET 104 is at a low level, the FET 104 is put in an OFF state, so that the supply of the power source voltage Va to the photo-interruptor 103 is blocked.

An FET 102 is an FET of P-channel type, and is a switch for suppling, as the power source voltage Vb for the photo-interruptor 115, the power source voltage Va always supplied from an electric power unit (not shown) of the image forming apparatus. In the case where output from a terminal D of the CPU 101 to a gate terminal of the FET 102 is at a low level, the FET 102 is put in an ON state, so that the power source voltage Vb is supplied to the photo-interruptor 115. On the other hand, in the case where the output from the terminal D of the CPU 101, to the gate terminal of the FET 102 is at a high level, the FET 102 is put in an OFF state, so that the supply of the power source voltage Vb to the photo-interruptor 115 is blocked.

Power Saving Mode

Next, an operation in the power saving mode in this embodiment will be described. The image forming apparatus of this embodiment is operable in an operation state (hereinafter, referred to as an operation mode) including a normal state in which electric power is supplied to respective portions in the image forming apparatus and a power saving state in which the electric power is supplied to a part of the portions in the image forming apparatus and in which an amount of electric power consumption is reduced. In the normal state (hereinafter, referred to as a normal mode), image formation on the sheet is carried out, and in the power saving state (hereinafter, referred to as a power saving mode), the image formation on the sheet is not carried out. Further, in the case where an image forming operation for printing an image on the sheet is not performed for a predetermined time, the CPU 101 changes the operation mode of the image forming apparatus from the normal mode to the power saving mode. Incidentally, the predetermined time is changeable, and can be changed by a command from an external host computer or through an operating portion provided on the image forming apparatus. Further, depending on the command from the external host, before the predetermined time has elapsed, the operation mode can also be forcedly changed from the normal mode to the power saving mode.

When the operation mode is changed to the power saving mode, the CPU 101 switches an oscillation mode from an oscillation mode by a clock signal (frequency: 20 MHz) from a crystal oscillation provided on an outside to an oscillation mode of a clock signal (frequency: several kHz) by CR oscillation in the CPU 101, for example. Further, the CPU 101 cuts off supply of the electric power to a control block in the CPU 101 which is not operated in the power saving mode, and thus carries out saving the electric power inside the CPU 101. Further, for example, the CPU 101 changes the terminals A, E and F, to which signals from the above-described photo-interruptor 103, door switch 108, and power source switch 110 are inputted, to external interrupt terminals. By this, an interrupt signal generates in the case where states of the signals inputted from the photo-interruptor 103, the door switch 108 and the power source switch 110 change, so that the CPU 101 is actuated and the operation mode of the image forming apparatus is changed from the power saving mode to the normal mode.

Further, the above-described photo-interruptor 115 is a detecting portion for detecting a device, as a detecting object, of which state is not required to be detected during the operation in the power saving mode. For that reason, the CPU 101 sets the state of the FET 102 at an OFF state during the operation in the power saving mode and cuts off the supply of the power source voltage Vb to the photo-interruptor 115, so that electric power consumption during the operation in the power saving mode can be suppressed. On the other hand, even when the terminal A to which the signal outputted from the photo-transistor of the photo-interruptor 103 is inputted is disposed as the external interrupt terminal, in the operation in the power saving mode, a current always flows through the LED which is a light emitting element, and therefore, the amount of electric power consumption is large. For that reason, in this embodiment, to the photo-interruptor 103, an operation in a monitoring mode described below is applied.

Monitoring Mode

The monitoring mode is an operation state in which a change in state of the photo-transistor of the photo-interruptor 103 of which signal is inputted to the terminal A, and is constituted by a first monitoring mode and a second monitoring mode. The first monitoring mode (first monitoring state) is a monitoring mode carried out by the CPU 101 during the operation in the power saving mode as the operation mode of the image forming apparatus until a state change of the photo-transistor of the photo-interruptor 103 of which signal is inputted to the terminal A is detected. On the other hand, the second monitoring mode (second monitoring state) is a monitoring mode carried out for discriminating whether or not the detected state change is effective in the case where the state change of the photo-transistor of the photo-interruptor 103 of which signal is inputted to the terminal A is detected.

First Monitoring Mode

A control operation in the first monitoring mode in this embodiment will be described using part [A] of FIG. 2 and FIG. 3. Part [A] of FIG. 2 is a timing chart for illustrating an operation of the CPU 101 in the first monitoring mode in the circuit described with reference to FIG. 1. In part [A] of FIG. 2, (a) shows an operation mode of the image forming apparatus, and in this embodiment, this operation mode is a "power saving mode". Further, (b) shows a voltage of a power source voltage Va, (c) shows a gate signal outputted from the terminal C of the CPU 101 and inputted to the gate terminal of the FET 104, and (d) shows a power source voltage Vs inputted to the gate terminal of the FET 104 during an ON state of the FET 104. When a signal of a high level is inputted to the gate terminal of the FET 104, the FET 104 is put in an ON state, so that the power source voltage Vs is supplied from the power source voltage Va to the photo-interruptor 103 through the FET 104. In part [A] of FIG. 2, (e) shows a signal inputted to the terminal A of the CPU 101 depending on the state of the photo-transistor of the photo-interruptor 103. In the case where the sheet is not placed on the manual feeding tray, the flag is in a position where the light beam from the LED is blocked. When the power source voltage Vs is inputted to the LED of the photo-interruptor 103 through the resistor 105, the light beam is emitted from the LED but is blocked by the flag, and therefore, the photo-transistor is put in an OFF state, so that a high level signal is inputted to the terminal A. On the other hand, in the case where the sheet is placed on the manual feeding tray, the flag is moved to a position deviated from the position where the light beam from the LED is blocked by the flag. When the power source voltage Vs is inputted to the LED of the photo-interruptor 103 through the resistor 105, the light beam is emitted from the LED, and the state of the photo-transistor is not a state in which the light beam is blocked by the flag and therefore is an ON state, so that a low level signal is inputted to the terminal A. Further, (f) shows timing when the CPU 101 acquires an input signal of the terminal A in a period in which a signal shown in (f) is at the high level. A time Toff is a period from an end of the period, in which the CPU 101 acquires the input signal of the terminal A, to a period in which the CPU 101 acquires a subsequent input signal of the terminal A. Incidentally, the abscissa of each of graphs of part [A] of FIG. 2 shows a time t, and each of T1, T2, T3 and T4 shows a time (timing). Incidentally, in the following description of the first monitoring mode, (a) to (f) in parentheses correspond to (a) to (f) in part [A] of FIG. 2.

FIG. 3 is a flow chart showing a control sequence in the first monitoring mode. A process shown in FIG. 3 is actuated when the operation mode of the image forming apparatus is changed to the power saving mode, and is carried out by the CPU 101. Incidentally, the CPU 101 includes a timer for measuring the time. Further, the CPU 101 is capable of detecting input by the user through the operating portion and input of a print job from an external computer, by a means which is not shown in FIG. 1.

In a step (hereinafter, referred to as S) 11, the CPU 101 outputs the low level signal from the terminal C ((c)), and sets the state of the FET 104 at the OFF state. By this, to the photo-interruptor 103, the power source voltage Vs is not supplied ((d)), and therefore, the state of the photo-transistor of the photo-interruptor 103 is in the OFF state, so that the level of the input to the terminal A of the CPU 101 becomes the high level ((e)). Further, the CPU 101 resets the timer and the starts the timer. In S12, the CPU 101 makes reference to the timer and discriminates whether or not the time Toff has elapsed ((f)). In the case where the CPU 101 discriminated that the time Toff has elapsed, the CPU 101 causes the process to go to S13, and in the case where the CPU 101 discriminated that the time Toff has not elapsed, the CPU 101 causes the process to return to S12.

In S13, the CPU 101 outputs the high level signal through the terminal C ((c)), and sets the state of the FET 104 at the ON state. By this, the power source voltage Vs ((d)) is supplied from the power source voltage Va ((b)) through the FET 104, and is inputted to the LED of the photo-interruptor 103, so that the light beam is emitted. Then, the CPU 101 resets a counter of number of times of acquisition of the input signal to the terminal A to zero, and causes the process to go to S14. In S14, the CPU 101 acquires the input signal (high level (H), low level (L)) to the terminal A thereof ((e), (f)) and increments the counter of the number of times of acquisition by 1. In S15, the CPU 101 discriminates whether or not a value of the counter indicating the number of times of acquisition of the input signal to the terminal A is N or more. The CPU 101 causes the process to go to S16 in the case where the CPU 101 discriminates that the value of the counter is N or more, and causes the process to returns to S14 in the case where the CPU 101 discriminated that the value of the counter is less than N.

In S16, the CPU 101 discriminates whether or not as regards the input signal to the terminal A acquired in the process of S14, there is a change in level of input signal from the high level to the low level, i.e., whether or not the level of the input signal to the terminal A is the low level. The CPU 101 causes the process to go to S17 in the case where the CPU 101 discriminated that the change in level of the input signal to the low level occurs, and causes the process to go to S18 in the case where there is no change in level of the input signal. In S17, the CPU 101 causes the process to go to a process in an operation in the second monitoring mode described later. In S18, the CPU 101 discriminates whether or not an input operation by the user through the operating portion or print job input from the external computer is detected. The CPU 101 causes the process to go to S19 in the case where the input operation through the operating portion or the print job normal is detected, and causes the process to return to S11 in the case where the input operation through the operating portion or the print job input is detected. In S19, the CPU 101 changes the operation mode of the image forming apparatus from the power saving mode to the normal mode depending on a change instruction to the normal mode from the user through the operation or the like of the operating portion.

The above-described process of FIG. 3 will be specifically described using part [A] of FIG. 2. In part [A] of FIG. 2, the time T1 shows timing when the time Toff has elapsed and the process of S13 is carried out. At the time T1, by the process of S13, the high level signal is outputted from the terminal C of the CPU 101 to the gate terminal of the FET 104 ((c)), so that the FET 104 is put in the ON state and thus the power source voltage Vs is supplied to the photo-interruptor ((d)). By supplying the power source voltage Vs to the photo-interruptor 103, it becomes possible to acquire a detection result of a presence or absence state of the sheet on the manual feeding tray by the photo-interruptor 103. In S14, the CPU 101 acquires the input signal to the terminal A to which the detection result of the photo-interruptor 103 is inputted ((e), (f)). In part [A] of FIG. 2, at this time, the sheet is not placed on the manual feeding tray, and therefore, a state in which the flag blocks the light beam emitted from the LED of the photo-interruptor 103 is formed. As a result, the photo-transistor cannot receive the light beam from the LED, and therefore, is in the OFF state, so that the level of the signal inputted to the terminal A of the CPU 101 is the high level ((e)). By the processes of S14 and S15, the acquisition of the input signal to the terminal A of the CPU 101 is performed from the time T1 to the time T2 ((f)), so that the acquisition of the input signal to the terminal A is performed N times from the time T1 to the time T2. In the process of S16, as a result that the CPU 101 acquires the input signal to the terminal A N times (N=1 in part [A] of FIG. 2), in the case of part [A] of FIG. 2, a low level state of the input signal to the terminal A cannot be detected ((e)). Further, in the process of S18, the CPU 101 does not detect also the operation or the like of the operating portion by the user for changing the operation mode of the image forming apparatus from the power saving mode to the normal mode, and therefore, the CPU 101 continues the operation in the power saving mode in the case of part [A] of FIG. 2. Incidentally, also, in a period from a time T3 to a time T4, a state in which the level of the input signal to the terminal A is inverted to the low level is not detected, and therefore, the power saving mode is continued.

As described above, when not only the state change of the input signal to the terminal A of the CPU 101 depending on the detection result of the photo-interruptor 103 is not detected but also change operation or the like of the operation mode to the normal mode by the user is not detected, the first monitoring mode maintained. As in this embodiment, by minimising the time interval from the time T1 to the time T2 (for example, N=1 (once)), even when an acquisition period (period from the T1 to the time T3) of the input signal to the terminal A is shortened by the CPU 101, it becomes possible to monitor the input signal to the terminal A in the power saving state (power saving mode).

Second Monitoring Mode

Subsequently, a control operation in the second monitoring mode in this embodiment will be described using part [B] and [C] of FIG. 2 and FIG. 4. Parts [B] and [C] of FIG. 2 are timing charts for illustrating an operation of the CPU 101 in the first monitoring mode and the second monitoring mode in the circuit described with reference to FIG. 1. Incidentally, part [B] of FIG. 2 shows the timing chart in the case where the sheet is placed on the manual feeding tray and part [C] of FIG. 2 shows the timing chart in the case where erroneous detection that the sheet is placed on the manual feeding tray is made, and these timing charts will be described specifically later. Further, graphs of (a) to (f) shown in each of parts [B] and [C] of FIG. 2 are similar to the graphs of (a) to (f) respectively, described with reference to part [A] of FIG. 2 and will be omitted from description of a way of understanding of the graphs. Incidentally, the abscissa of each of graphs of parts [B] and [C] of FIG. 2 shows a time t, and each of T1, T2, T3, T4 and T5 shows a time (timing). Incidentally, in the following description of the first monitoring mode and the second monitoring mode, (a) to (f) in parentheses correspond to (a) to (f) in part [B] and [C] of FIG. 2.

FIG. 4 is a flow chart showing a control sequence in the first monitoring mode. A process shown in FIG. 4 is actuated when the process of S17 of FIG. 3 is carried out, and is carried out by the CPU 101. In S20, the CPU 101 sets a counter of number of times of acquisition of the input signal to the terminal A at zero. In S21, the CPU 101 acquires the input signal (high level (H), low level (L)) to the terminal A thereof and increments the counter of the number of times of acquisition by 1. In S22, the CPU 101 discriminates whether or not the number of times of acquisition of the input signal to the terminal A, indicated by a value of the counter is X or more. The CPU 101 causes the process to go to S23 in the case where the CPU 101 discriminates that the value of the counter is X or more, and causes the process to returns to S21 in the case where the CPU 101 discriminated that the value of the counter is less than X. Incidentally, in order to properly discriminate whether or not the change in input signal to the terminal A is erroneous detection due to noise or the like, a cyclic period in which the input signal to the terminal A in the second monitoring mode is made shorter than a cyclic period in the case of the first monitoring mode. For that reason, even when the number of times of acquisition of X is made larger than the number of times of acquisition of N (X>N), an acquisition time can be shortened..

In S23, the CPU 101 discriminates whether or not the number of times of acquisition of the low level input signal of the input signal to the terminal A acquired in the process of S21 is a predetermined number of times or more. In the case where the number of times of acquisition of the low level input signal is the predetermined number of times or more, the CPU 101 causes the process to go to S24, and in the case where the number of times of acquisition of the low level input signal is less than the predetermined number of times, the CPU 101 causes the process to go to S25.

In S24, the CPU 101 causes the operation mode of the image forming apparatus to change from the power saving mode to the normal mode since the placement of the sheet on the manual feeding tray is detected, and then ends the process. In S25, the CPU 101 discriminates whether or not an input by the user through the operating portion or print job input from the external computer is detected. The CPU 101 causes the process to go to S26 in the case where the input operation through the operating portion or the print job normal is detected, and causes the process to go to S27 in the case where the input through the operating portion or the print job input is detected. In S26, the CPU 101 changes the operation mode of the image forming apparatus from the power saving mode to the normal mode depending on a change instruction of the operation mode from the user, and ends the process. In S27, the CPU 101 discriminates that detection of the input signal to the terminal A was erroneous detection, and causes the process to return to the above-described process in the first monitoring mode.

Next, the above-described process of FIG. 4 will be specifically describes using part [B] of FIG. 2. Part [B] of FIG. 2 is the timing chart for illustrating the operation in the case where the sheet is placed on the manual feeding tray in the period from the time T2 to the time T3. In FIG. 2, (e) of part [B] is different from (e) of part [A] in that the level of the signal inputted to the terminal A in the period from the time T2 to the time T4 is the low level. The sheet is placed on the manual feeding tray, whereby the flag is moved to the position deviated from between the LED and the photo-transistor of the photo-interruptor 103. For that reason, the photo-transistor receives the light beam emitted from the LED, so that the photo-transistor is put in the ON state. As a result, the level of the signal inputted to the terminal A of the CPU 101 becomes the low level ((e)). As a result, in the period from the time T3 to the time T4, the CPU 101 acquires N time (=1 (once)) the input signal to the terminal A by the process of S14 and S15 shown in FIG. 3. Then, in the process of S16, the low level input signal is detected a predetermined number of times (once in part [B] of FIG. 2) or more, and therefore, the monitoring mode to is changed to the second monitoring mode in the process of S17.

Subsequently, the CPU 101 carries out the process in the second monitoring mode shown in FIG. 4. In the period from the time T4 to the time T5 in part [B] of FIG. 2, the CPU 101 acquires X times the input signal to the terminal A in order to discriminate whether or not a detection result of the low level input signal to the terminal A detected by the processes of S21 and S22 of FIG. 4 is correct ((e), (f)). At this time, in order to accurately discriminate whether or not the input signal to the terminal A detected in the period from the time T3 to the time T4 is erroneously detected due to the noise or the like, a duration of time from the time T4 to the time T5 is set so as to be longer than the duration of time from the time T3 to the time T4 ((f)). In the case of part [B] of FIG. 2, detection that the level of the input signal to the terminal A acquired X times in the processes of S21 and S22 is the low level is made a predetermined number of times or more, and therefore, the CPU 101 discriminates that a detection result of the low level input signal to the terminal A detected in the period from the time T2 to the time T4 is correct. As a result, the CPU 101 detected that the sheet is placed on the manual feeding tray, and therefore, by the process of S24, the CPU 101 causes the operation mode of the image forming apparatus to be changed from the power saving mode to the normal mode.

Next, the above-described process of FIG. 4 will be specifically described using part [C] of FIG. 2. Part [C] of FIG. 2 is the timing chart in which the level of the signal inputted to the terminal A is low level in the period from the time T3 to the time T4 similarly as in part [B] of FIG. 2. For that reason, similarly as in the case of part [B] of FIG. 2 the CPU 101 acquires N time (=1 (once)) the input signal to the terminal A by the process of S14 and S15 shown in FIG. 3, and in the process of S16, the low level input signal is detected a predetermined number of times (once in part [B] of FIG. 2) or more, and therefore, the monitoring mode is changed to the second monitoring mode in the process of S17.

Subsequently, similarly as in the case of part [B] of FIG. 2, the CPU 101 carries out the process in the second monitoring mode shown in FIG. 4. In the period from the time T4 to the time T5 in part [C] of FIG. 2, the CPU 101 acquires X times the input signal to the terminal A in order to discriminate whether or not a detection result of the low level input signal to the terminal A detected by the processes of S21 and S22 of FIG. 4 is correct ((e), (f)). However, in the case of part [C] of FIG. 3, of the input signal to the terminal A acquired N times in the processes of S21 and S22, the low level input signal is acquired only once, and other input signals acquired are the high level input signals ((e), (f)). For that reason, the CPU 101 discriminates in the process of S23 that a detection result of the low level input signal to the terminal A detected in the period from the time T3 to the time T4 is an erroneous detection result. Then, in the process of S25, the CPU 101 does not detect input by the user through the operating portion and print job input from the external computer, and therefore, by the process of S27, the operation mode is kept in the power saving mode and the process returns to the process in the first monitoring mode.

As described above, in this embodiment, in the case where the operation mode of the image forming apparatus is the power saving mode, the first monitoring mode and the second monitoring mode are provided, and monitoring of a signal change of the terminal A to which current of the photo-interruptor 103 is inputted is performed. By this, monitoring of the state in which the sheet is placed on the manual feeding tray can be performed with low electric power consumption, so that the change in operation mode from the power saving mode to the normal mode can be made without lowering usability. Further, in this embodiment, as a condition for changing the operation mode from the power saving mode to the normal mode, the case where the detection result of the photo-interruptor 103 changes from a state (high level) in which the input signal to the terminal A indicates absence of the sheet to a state (low level) in which the input signal to the terminal A indicates presence of the sheet was described. However, when the operation mode of the image forming apparatus changes from the normal mode to the power saving mode, the CPU 101 causes a memory which is a storing means included inside the CPU 101 to store a state of the input signal to the terminal A to which the detection result of the photo-interruptor 103 is inputted. Then, in the power saving mode, the CPU 101 performs a control sequence in which the monitoring mode is changed to the second monitoring mode by detecting that the state of the input signal to the terminal A is changed from the state of the terminal A.

Incidentally, in this embodiment, the photo-interruptor 103 which is a monitoring object in the first monitoring mode and the second monitoring mode in the operation in the power saving mode was described as a sensor for detecting the presence or absence of the sheet on the manual feeding tray. An application example of the photo-interruptor 103 in this embodiment is an example, and the photo-interruptor 103 may also be used in another apparatus (device) for detecting a state change of an apparatus of which operation mode is intended to be changed to the normal mode by detecting user access in an operation in the power saving mode. For example, the photo-interruptor 103 may also be a sensor for detecting presence or absence of the sheet accommodated in the sheet feeding cassette, a sensor for detecting presence or absence of the sheet feeding cassette, a sensor for detecting opening/closing of the maintenance door opened and closed when the cartridge is exchanged or the like, and the like sensor. Further, in this embodiment, as the sensor, the photo-interruptor was used, but the sensor is not limited to the photo-interruptor. Further, even a sensor of a switch type in which the current does not flow in an open state consumes electric power in a state which is not a state in which the operation mode is restored to the normal mode during the operation in the power saving mode. In the case where such a sensor is used, the constitution in which the electric power is supplied only in the period in which the state of the sensor is detected as in this embodiment is effective in the operation in the power saving mode.

FIG. 5 is a circuit diagram showing an example of a circuit for supplying the power source voltage Vs of the photo-interruptor 103. In FIG. 1, by controlling the ON/OFF state of the FET 104 depending on the timing when the b signal input to the terminal A is acquired, whereby the power source voltage Vs of the photo-interruptor 103 was supplied form the power source voltage Va through the FET 104. In FIG. 5, a constitution in which the FET 104 shown in FIG. 1 is deleted and in which the power source voltage Vs is supplied to the photo-interruptor 103 by outputting the high level signal from the CPU 101 through the terminal C is employed. By this, the circuit of FIG. 5 has a circuit constitution reduced in cost compared with the circuit of FIG. 1.

As described above, according to this embodiment, it is possible to reduce the electric power consumption during the operation in the power saving mode without lowering usability. That is, in the first monitoring mode, the monitoring is performed in a long cyclic period, and therefore, power saving is realized. When the sheet on the manual feeding tray is once detected and the monitoring mode is changed to the second monitoring mode, the monitoring is performed in a short cyclic period, and therefore, a first monitoring result can be determined, so that usability is not lowered.

Embodiment 2

In an embodiment 2, an embodiment in which electric power consumption during the operation in the power saving mode is reduced more than in the case of the embodiment 1 will be described. Incidentally, a control sequence of the CPU 101 in the first monitoring mode and in the second monitoring mode during the operation in the power saving mode is similar to the control sequence shown in FIGS. 3 and 4 of the embodiment 1 and will be omitted from description in this embodiment.

Constitution of Controller and Peripheral Circuit

Part [A] of FIG. 6 is a circuit diagram showing a circuit constitution of a part of the CPU 101 in this embodiment and a peripheral circuit of the CPU 101. Incidentally, part [A] of FIG. 6 is different from FIG. 1 of the embodiment 1 in that the resistor 105 in FIG. 1 is replaced with a circuit in which a circuit in which an FET 116 and a resistor 118 are connected in series is connected to a resistor 117 in parallel. Further, the FET 116 (second switch means) is an FET of an N-channel type, and a gate terminal is connected to a terminal G of the CPU 101. Further, in the case where a low level signal is outputted from the CPU 101 through the terminal G, the FET 116 is put in the OFF state, and a current path between the power source voltage Vs and the resistor 118 is cut off, so that a state in which the resistor 117 is connected to the anode terminal of the LED of the photo-interruptor 103 is formed. On the other hand, in the case where a high level signal is outputted from the CPU 101 through the terminal G, the FET 116 is put in the ON state, and a state in which to the anode terminal of the LED of the photo-interruptor 103, the resistor 117 and the resistor 118 which are connected to each other in parallel are connected is formed.

In this embodiment, in the first monitoring mode in the operation in the power saving mode, the CPU 101 outputs the low level signal through the terminal G and sets the state of the FET 116 at the OFF state. As a result, the FET 116 is in the OFF state, and therefore, the current flowing through the LED of the photo-interruptor 103 is limited only by the resistor 117. On the other hand, in the second monitoring mode, the CPU 101 outputs the high level signal through the terminal G and sets the state of the FET 116 at the ON state. As a result, the FET 116 is in the ON state, and therefore, the current flowing through the LED of the photo-interruptor 103 is limited by a resistance value obtained by parallel connection of the resistors 117 and 118. Incidentally, in this embodiment, the resistance value in the case here the resistors 117 and 118 are connected in parallel is equal to a resistance value of the resistor 105 in FIG. 1 of the embodiment 1. For that reason, the resistor 117 has a larger resistance value than the resistance value of the resistor 105, and therefore, in the first monitoring mode, the current flowing through the LED of the photo-interruptor 103 is smaller than the output flowing through the LED of the photo-interruptor 103 in the embodiment 1. As a result, electric power consumption in the first monitoring mode in the embodiment 2 is smaller than the electric power consumption in the first monitoring mode in the embodiment 1.

Monitoring Mode

Part [B] of FIG. 6 is a timing chart for illustrating an operation in the first monitoring mode and the second monitoring mode in the circuit described with reference to part [A] of FIG. 6, and is the timing chart in the case where the sheet is placed on the manual feeding tray in a period from a time T2 to a time T3. In part [B] of FIG. 6, graphs of (a) to (d) are similar to graphs (a) to (d), respectively, described with reference to FIG. 2, and graphs of (g) and (h) are similar to the graphs of (e) and (f) respectively, described with reference to FIG. 2 and therefore will be omitted from description of a way of understanding of the graphs. In part [B] of FIG. 6, (e) shows the gate signal inputted to the FET 116 through the gate terminal, and (f) shows a value of the current flowing through the LED of the photo-interruptor 103. Incidentally, the abscissa of each of graphs of part [B] of FIG. 6 shows a time t, and each of T1, T2, T3, T4 and T5 shows a time (timing). Incidentally, in the following description of the first monitoring mode and the second monitoring mode, (a) to (n) in parentheses correspond to (a) to (h) in part [B] of FIG. 2.

In part [B] of FIG. 6, in a period from a time T1 to time T2, the CPU 101 acquires the input signal to the terminal A in order to detect a presence or absence state of the sheet on the manual feeding tray. For that reason, the CPU 101 outputs the high level signal to the gate terminal of the FET 104 through the terminal C ((c)) and sets the state of the FET 104 at the ON state, and thus supplies the power source voltage Vs to the photo-interruptor 103 ((d)). The power source voltage Vs is supplied to the photo-interruptor 103, so that the current flows through the LED and the light beam is emitted from the LED ((f)), and thus it becomes possible to acquire a detection result of the presence or absence state of the sheet on the manual feeding tray by the photo-interruptor 103. Incidentally, at this time, the low level signal is outputted from the CPU 101 through the terminal G to the FET 116 through the gate terminal ((e)), and therefore, the FET 116 is put in the OFF state. As a result, to the LED of the photo-interruptor 103, the power source voltage Vs is supplied through the resistor 117. Incidentally, a state in a period from a time T3 to a time T4 described later is similar to the above-described state in the period from the time T1 to the time T2. In the period from the time T1 to the time T2, a state in which the level of the input signal to the terminal A is reversed to the low level is not detected, and therefore, the power saving mode is continued.

Subsequently, also, in the period from the time T3 to the time T4, similarly as in the period from the time T1 to the time T2, the CPU 101 acquires the input signal to the terminal A in order to detect the presence or absence state of the sheet on the manual feeding tray. In the period from the time T3 to the time T4, the CPU 101 detects the state in which the level of the input signal to the terminal A is reversed to the low level ((g)), and therefore, the monitoring mode is changed to the second monitoring mode.

In the second monitoring mode in a period from the time T4 to the time T5, the CPU 101 acquires X times the input signal to the terminal A in order to discriminate whether or not the detection result of the low level input signal to the terminal A detected in the period from the time T3 to the time T4 is correct ((g), (h)). At this time, the CPU 101 outputs the high level signal through the terminal G ((e)), and sets the state of the FET 116 at the ON state. The FET 116 is in the ON state, and therefore, the current flowing through the LED of the photo-interruptor 103 is limited by the resistance value obtained by parallel connection of the resistors 117 and 118. The resistance in the case where the resistors 117 and 118 are connected in parallel in smaller than the resistance value of the resistor 117, and therefore, the current flowing through the LED of the photo-interruptor 103 is larger than the current flowing through the LEF of the photo-interruptor 103 in the first monitoring mode ((f)).

In the case of part [B] of FIG. 6, detection that the level of the input signal to the terminal A acquired X times is the low level is made a predetermined number of times or more, and therefore, the CPU 101 discriminates that a detection result of the low level input signal to the terminal A detected in the period from the time T2 to the time T4 is correct. As a result, the CPU 101 detected that the sheet is placed on the manual feeding tray, and therefore, the CPU 101 causes the operation mode of the image forming apparatus to be changed from the power saving mode to the normal mode.

As described above, during the operation in the second monitoring mode, the current is caused to flow through the photo-interruptor 103 via the resistors 105 and 117 which are connected in parallel, so that whether or not the state change of the terminal A detected in the first monitoring mode is correct can be accurately discriminated. A combined resistance value of the resistors 105 and 117 is equal to the resistance value of the resistor 105 in the embodiment 1. On the other hand, during the operation in the first monitoring mode, the resistor connected to the photo-interruptor 103 is only the resistor 117, and therefore, the resistance value becomes larger than the resistance value of the resistor 105 in the embodiment 1. As a result, the current flowing through the photo-interruptor 103 can be made small, and therefore, electric power consumption can be further reduced than in the embodiment 1.

As described above, according to this embodiment, the electric power consumption during the operation in the power saving mode can be reduced without lowering usability.

Embodiment 3

The CPU 101 described in the embodiments 1 and 2 is supplied with the power source voltage Vs performs the image forming operation of the image forming apparatus and various pieces of control depending on input and the like through the operating portion by the user. In the following, a structure of the image forming apparatus to which the CPUs 101 in the embodiments 1 and 2 are applied will be described.

Image Forming Apparatus

As an example of the image forming apparatus, a laser beam printer will be described. FIG. 7 illustrates a schematic structure of the laser beam printer which is an example of an electrophotographic printer. A laser beam printer 300 includes a photosensitive drum 311 as an image bearing member for forming an electrostatic latent image, a charging portion (charging means) 317 for electrically charging the photosensitive drum 311 uniformly, and a developing portion (developing means) 312 for developing, with a toner, the electrostatic latent image formed on the photosensitive drum 311. Incidentally, the photosensitive drum 311, the charging portion 317, and the developing portion 312 are integrally assembled into a unit and are accommodated in a cartridge 319. The toner image formed on the photosensitive drum 311 is transferred by a transfer portion (transfer means) 318 onto a sheet (not shown) as a recording material supplied from a cassette 316 or from a manual feeding tray 321. The toner image transferred on the sheet is fixed by a fixing device 314 and thereafter the sheet is discharged onto a discharge tray 315. The photosensitive drum 311, the charging portion 317, the developing portion 312 and the transfer portion 318 constitute an image forming portion (image forming means). Further, the laser beam printer 300 includes a power source device 500 for supplying the power source voltage Vs described in the embodiments 1 and 2. Further, the laser beam printer 300 includes an operating portion 322 for permitting the user to input data and to provide an instruction to the laser beam printer 300, and includes a main (power source) switch 323. The image forming apparatus to which the CPU 101 is applicable is not limited to the image forming apparatus shown in FIG. 7, but may also be an image forming apparatus including a plurality of image forming portions, for example. The image forming apparatus may also be an image forming apparatus including a primary transfer portion where the toner image is transferred from the photosensitive drum 311 onto an intermediary transfer belt and a secondary transfer portion where the toner image is transferred from the intermediary transfer belt onto the sheet.

The laser beam printer 300 includes a controller 320 for controlling an image forming operation by the image forming portion and a sheet feeding operation, and the controller 320 corresponds to the CPUs 101 in the embodiments 1 and 2. Further, the controller 320 detects whether or not the sheet is placed on the manual feeding tray 321 through a sensor (corresponding to the photo-interruptors 103 in the embodiments 1 and 2. The laser beam printer 300 is capable of switching two operation states thereof consisting of the normal mode in which image formation is carried out and the power saving mode in which electric power saving is realized.

As described above, according to this embodiment, the electric power consumption during the operation in the power saving mode can be reduced without lowering the usability.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-094059 filed on May 29, 2020, which is hereby incorporated by reference herein in its entirety.

What is claimed is:

1. An image forming apparatus comprising:
    a controller configured to control an image forming operation; and
    a detecting portion configured to detect a state of the image forming apparatus by being supplied with electric power and to output a signal indicating the state of the image forming apparatus to the controller,
    wherein the controller switches a state of the detecting portion between a first monitoring state in which a detection result of said detecting portion is acquired by supplying the electric power to said detecting portion in a first cyclic period and a second monitoring state in which a detection result of said detecting portion is acquired by supplying the electric power to said detecting portion in a second cyclic period shorter than the first cyclic period, and and
    in case that the signal output from said detecting portion changes in the first monitoring state, said controller switches the state of said detecting portion to a second monitoring state.

2. An image forming apparatus according to claim 1, further comprising a sheet feeding portion where a recording material is placed,
    wherein the detecting portion detects presence or absence of the recording material placed on the sheet feeding portion,
    wherein a state of said image forming apparatus is switchable between a normal state in which the electric power is always supplied to said detecting portion and a power saving state in which the electric power is supplied to said detecting portion in the first cyclic period or the second cyclic period, and wherein said controller controls said image forming apparatus so that the state of said image forming apparatus is changed from the power saving state to the normal state after the state of said detecting portion is switched from the first monitoring state to the second monitoring state in the power saving state.

3. An image forming apparatus according to claim 2, further comprising a storing portion configured to store a state of the recording material on said sheet feeding portion when the state of said image forming apparatus is changed to the power saving state, wherein in a case that the state of the recording material detected by said detecting portion and the state of the recording material stored in said storing portion are different from each other, the state of the image forming apparatus is changed from the power saving state to the normal state.

4. An image forming apparatus according to claim 2, wherein in a case of the power saving state, said controller sets the state of said detecting portion at the first monitoring state in which monitoring that the recording material is placed on said sheet feeding portion is performed, and when said detecting portion detects that the recording material is placed on said sheet feeding portion, said controller switches the state of said detecting portion to the second monitoring state to determine that the detection result of said detecting portion is effective.

5. An image forming apparatus according to claim 1, wherein said controller switches the state of said detecting portion to the second monitoring state when in the first monitoring state, the detecting portion detects at least one time that the recording material is placed on said sheet feeding portion.

6. An image forming apparatus according to claim 5, wherein said controller changes the state of said image forming apparatus from the power saving state to the normal state when in the second monitoring state, said detecting portion detects a predetermined number of times or more that the recording material is placed on said sheet feeding portion.

7. An image forming apparatus according to claim 6, wherein a time in which the electric power is supplied so that in the second monitoring state, said detecting portion detects that the recording material is placed on said sheet feeding portion is longer than a time in which the electric power is supplied so that in the first monitoring state, said detecting portion detects that the recording material is placed on said sheet feeding portion.

8. An image forming apparatus according to claim 5, wherein said controller switches the state of said detecting portion to the first monitoring state when in the second monitoring state, said detecting portion does not detect a predetermined number of times or more that the recording material is placed on said sheet feeding portion.

9. An image forming apparatus according to claim 5, wherein a time in which the electric power is supplied so that in the second monitoring state, said detecting portion detects that the recording material is placed on said sheet feeding portion is longer than a time in which the electric power is supplied so that in the first monitoring state, said detecting portion detects that the recording material is placed on said sheet feeding portion.

10. An image forming apparatus according to claim 1, further comprising a first switch portion configured to perform supply of the electric power to said detecting portion or cut-off of the supply of the electric power, wherein when said detecting portion detects the presence or absence of the recording material, said controller supplies the electric power to said detecting portion by controlling said first switch portion.

11. An image forming apparatus according to claim 1, further comprising:

a light emitting portion configured to emit a light beam;

a light receiving portion configured to receive the light beam; and a flag configured to block the light beam when the recording material is not placed on said sheet feeding portion and configured to permit transmission of the light beam when the recording material is placed on said sheet feeding portion, wherein said controller switches a value of a current flowing through said light emitting portion depending on the first monitoring state or the second monitoring state, and the value of the current flowing through said light emitting portion in the first monitoring state is smaller than the value of the current flowing through said light emitting portion in the second monitoring state.

12. An image forming apparatus according to claim 11, further comprising:

a first resistor having one terminal connected at one terminal thereof to said detecting portion between said first switch portion and said light emitting portion of said detecting portion;

a circuit in which a second switch portion for connecting or cutting off a path between the other terminal of said first resistor and said first switch portion is connected in series; and a second resistor connect in parallel to said circuit, wherein in the first monitoring state, said controller connects said second resistor to said light emitting portion by cutting off the path between said first resistor and said first switch portion by controlling said second switch portion, and in the second monitoring state, said controller connects said first resistor and said second resistor, which are connected in parallel to each other, to said light emitting portion by connecting the path between said first resistor and said first switch portion by controlling said second switch portion.

13. An image forming apparatus according to claim 1, further comprising an operating portion configured to permit input of an instruction relating to an operation of said image forming apparatus, wherein in the first monitoring state or the second monitoring state, said controller changes the state of said image forming apparatus from the power saving state to the normal state depending on the instruction inputted through said operating portion.

* * * * *